US008666088B2

(12) United States Patent
Khami et al.

(10) Patent No.: US 8,666,088 B2

(45) Date of Patent: Mar. 4, 2014

(54) TUNABLE, SOUND ENHANCING AIR INDUCTION SYSTEM FOR INTERNAL COMBUSTION ENGINE

(75) Inventors: Roger Khami, Troy, MI (US); Jose Arteaga, Dearborn, MI (US); Shawn Carney, Ypsilanti, MI (US); Steve Connolly, Westland, MI (US); Hovie Jarrett Cassell, Birmingham, MI (US)

(73) Assignee: Ford Global Technologies, Dearborn, MI (US)

( * ) Notice: Subject to any disclaimer, the term of this patent is extended or adjusted under 35 U.S.C. 154(b) by 1116 days.

(21) Appl. No.: 12/490,590

(22) Filed: Jun. 24, 2009

(65) Prior Publication Data

US 2010/0329476 A1 Dec. 30, 2010

(51) Int. Cl.
*H04B 1/00* (2006.01)

(52) U.S. Cl.
USPC .......................................... 381/86; 381/71.4

(58) Field of Classification Search
USPC ................................ 381/71.1, 71.2, 71.4, 86
See application file for complete search history.

(56) References Cited

U.S. PATENT DOCUMENTS

| | | | | |
|---|---|---|---|---|
| 2,033,426 | A | 3/1936 | Grover | |
| 2,940,537 | A | 6/1960 | Smith et al. | |
| 5,850,458 | A * | 12/1998 | Tomisawa et al. | 381/71.4 |
| 5,974,155 | A * | 10/1999 | Kashani et al. | 381/71.14 |
| 6,358,106 | B1 | 3/2002 | Herrera | |
| 7,801,570 | B2 * | 9/2010 | Cheung et al. | 455/569.1 |
| 2002/0039422 | A1 * | 4/2002 | Daly | 381/71.4 |
| 2002/0124734 | A1 | 9/2002 | Spannbauer et al. | |
| 2007/0292816 | A1 | 12/2007 | Miller | |
| 2008/0034730 | A1 | 2/2008 | Filippone | |
| 2008/0192954 | A1 * | 8/2008 | Honji et al. | 381/86 |
| 2009/0242323 | A1 * | 10/2009 | Densmore et al. | 181/229 |

FOREIGN PATENT DOCUMENTS

DE 19704376 A1 8/1998

* cited by examiner

*Primary Examiner* — Duc Nguyen
*Assistant Examiner* — George Monikang
(74) *Attorney, Agent, or Firm* — Jerome R. Drouillard; David Kelley

(57) ABSTRACT

A tunable, sound enhancing air induction system for an internal combustion engine includes an air supply duct extending between an air cleaner and a throttle body, and an acoustic amplifier mounted to the air supply duct at an anti-node of a desirable engine induction sound. The acoustic amplifier furnishes the desired sound to the passenger compartment of the vehicle, either through a duct, or by a directional horn.

17 Claims, 4 Drawing Sheets

TUNABLE, SOUND ENHANCING AIR INDUCTION SYSTEM FOR INTERNAL COMBUSTION ENGINE

BACKGROUND OF THE INVENTION

1. Field of the Invention

The present invention relates to an engine combustion air induction system which may be tuned to amplify desirable sound characteristics.

2. Related Art

Automotive designers have succeeded in rendering the passenger compartments of automobiles and light trucks increasingly quieter, to a point at which much of the audible feedback formerly provided by the engine to the driver has been eliminated. With certain vehicles, such as sports cars and light trucks, however, it is desirable to provide an engine-derived sound characteristic within a vehicle's passenger compartment. This is problematic because sound insulation used to attenuate undesirable engine noises interferes with the transmission of desirable sounds. It would be desirable to provide an air induction system for an automotive internal combustion engine in which a desirable sound characteristic is provided to the occupants of the vehicle's passenger compartment as an audible indication of engine operation.

SUMMARY OF THE INVENTION

An air induction system for an internal combustion engine includes an air cleaner, a throttle body, a combustion air supply duct extending from the air cleaner to the throttle body, and a tuned acoustic amplifier mounted to the air duct. According to an aspect of the present invention, the acoustic amplifier includes a diaphragm mounted to the duct. The acoustic amplifier may further include a directional horn having a base which is acoustically coupled to the diaphragm.

According to another aspect of the present invention, a diaphragm located within an acoustic amplifier according to the present invention has a natural frequency of vibration which is tuned to the frequency of a desirable air induction sound. In general, the acoustic amplifier will be mounted along the length of the air supply duct extending from the air cleaner to the throttle body, at a location of a desired sound pressure anti-node. This anti-node will be characterized by sound pressure at a selected, desirable, frequency.

According to another aspect of the present invention, a diaphragm utilized in an acoustic amplifier according to the present invention is impermeable and sealed to prevent induction air from entering or leaving the supply air duct through the acoustic amplifier.

According to another aspect of the present invention, a method for enhancing the sound quality of an internal combustion engine includes determining the frequency of a desirable sound being generated within an air supply duct comprising a portion of an induction system of the engine, and locating at least one anti-node corresponding to the desired frequency. The method also includes providing a diaphragm-driven horn at the location of at least one anti-node, with the diaphragm being tuned to have a natural frequency which is matched to the frequency of the desirable sound.

According to another aspect of the present invention, a tuned, sound enhancing air induction system for an internal combustion engine installed in a motor vehicle includes an air cleaner, a throttle body, an air supply duct extending from the air cleaner to the throttle body, and an acoustic amplifier mounted to the air duct. The acoustic amplifier amplifies engine induction sound which is otherwise confined by the air supply duct and which has at least one pre-selected frequency. A sound collector and acoustic transfer duct for supply engine induction sound at the pre-selected frequency to a portion of the vehicle.

According to another aspect of the present invention, a sound collector and acoustic transfer duct include a flexible sound-insulated duct which is routed into the passenger compartment of a vehicle, so that engine induction sound having a pre-selected frequency will be audible to an occupant of the vehicle.

It is an advantage of a system according to the present invention that undesirable engine noise may be excluded from the passenger compartment of a vehicle, while allowing or permitting a desirable sound, at a frequency which is indicative of engine performance, to be introduced into the passenger compartment of the vehicle.

Other advantages, as well as features of the present invention will become apparent to the reader of this specification.

DETAILED DESCRIPTION OF THE PREFERRED EMBODIMENTS

Figure 1:
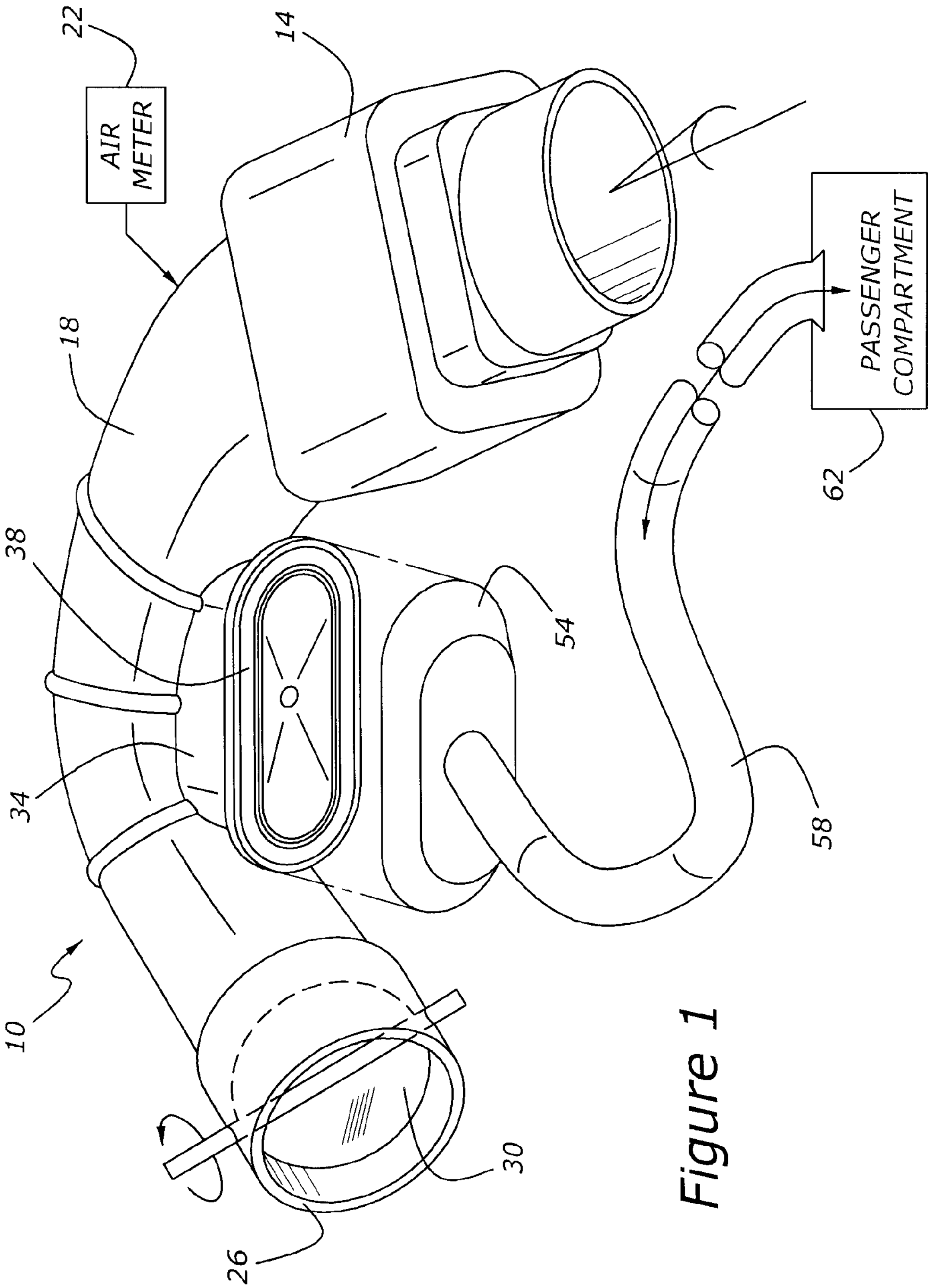
FIG. 1 is a partially schematic representation of a tuned, sound enhancing air induction system for an internal combustion engine according to the present invention.

As shown in FIG. 1, a tunable, sound enhancing air induction system for an internal combustion engine, and particularly, an automotive internal combustion engine, includes an air supply duct, 18, which extends between an air cleaner, 14, and a throttle body, 26, having a throttle valve, 30, contained therein. An air meter, 22, provides an engine control computer (not shown) with an accurate indication of the airflow through the engine. It is not desirable to have any leaks of air into or out of air supply duct 18, because this will destroy the capability of the engine's control processor to adequately manage the air fuel ratio of the engine, which is essential to proper fuel economy and emissions control. Stated another way, all of the air passing through the engine must be accounted for by air meter 22. This means that leaks in air supply duct 18 are antithetical to proper engine control.

Figure 2:
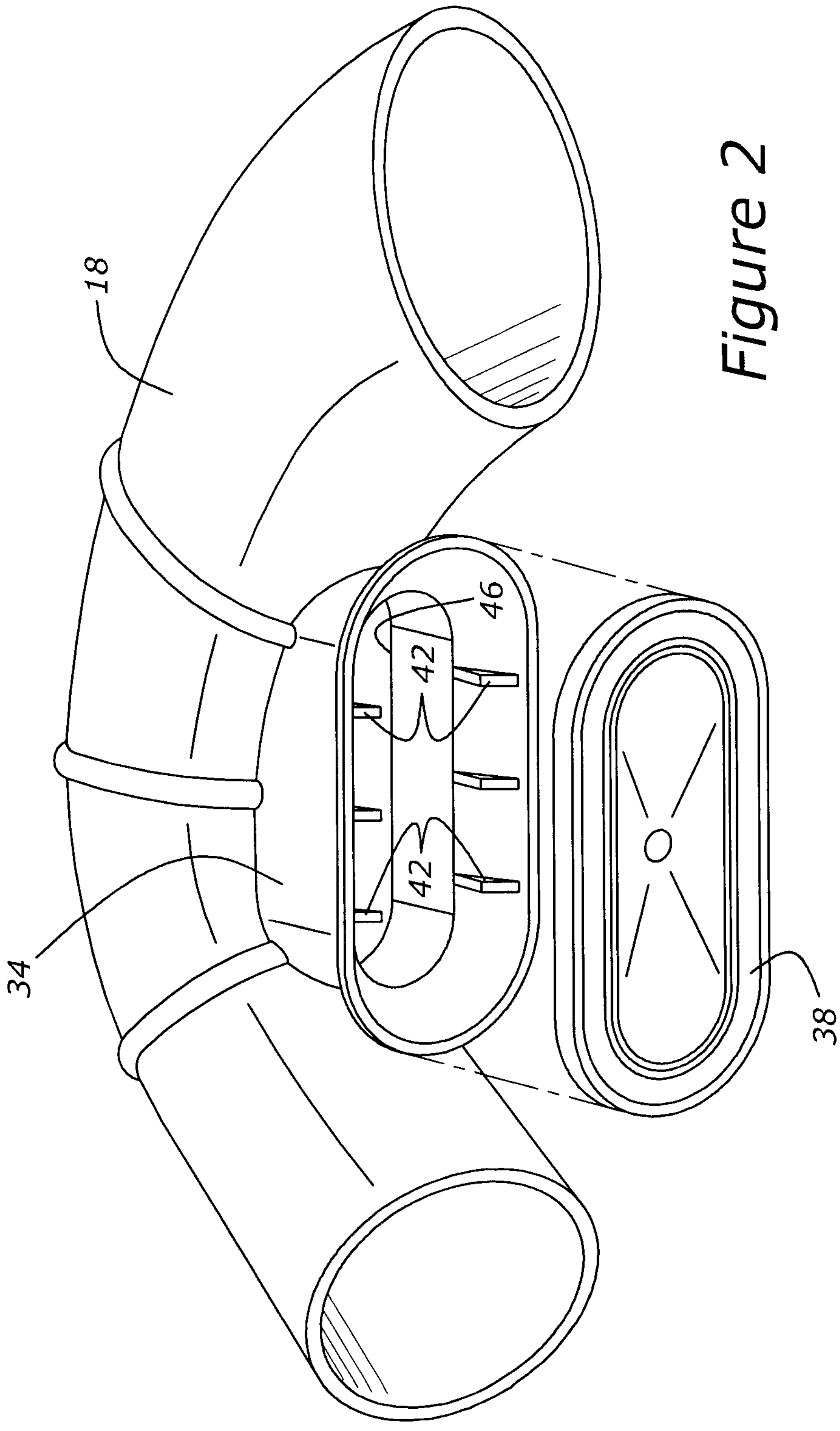
FIG. 2 illustrates a portion of the air induction system of FIG. 1, showing a diaphragm of an acoustic amplifier in an exploded view.
Figure 3:
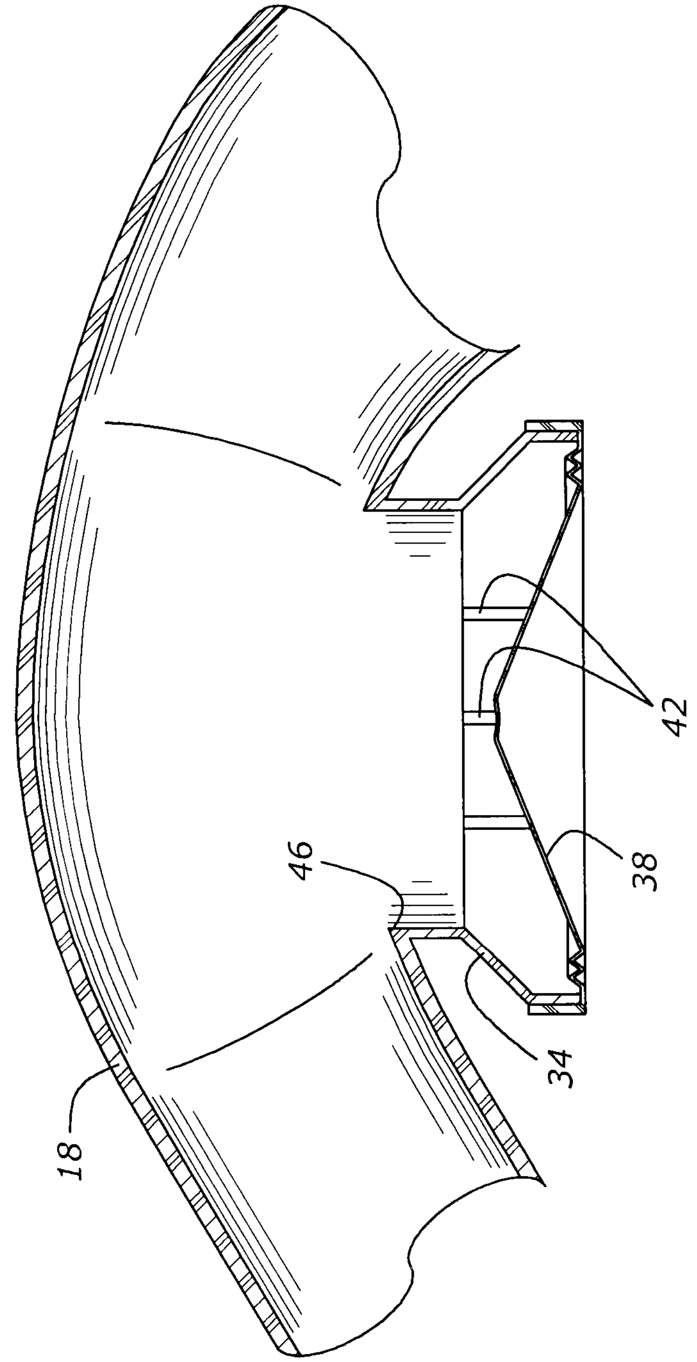
FIG. 3 is a partial sectional view showing a diaphragm and port in an air supply duct according to an aspect of the present invention.

An acoustic amplifier is mounted to air supply duct 18. This includes a diaphragm base, 34, which is mounted to duct 18 adjacent to a port, 46, formed in duct 18, as shown in FIGS. 2 and 3. Diaphragm base 34 has a number of stops, 42, which help to support a diaphragm, 38, which is mounted to diaphragm base 34.

Diaphragm 38 is placed along the length of air supply duct 18 at the location of a sound pressure anti-node characterized by a selected desirable frequency of noise emission. Diaphragm 38 is impermeable and is sealed to prevent induction air from entering or leaving air supply duct 18 through the acoustic amplifier. In other words, there is no bulk flow of air, either into, or out of air supply duct 18 through diaphragm 38.

Diaphragm 38 is preferably constructed from a durable, heat-resistant material such as the several plastic materials known to those skilled in the art and used for loudspeaker fabrication. Tuning of diaphragm 38 is achieved by changing the stiffness of the diaphragm, such as by altering the diaphragm's thickness, or the material composition, or the number of pleats placed in the diaphragm. What is important is that the natural frequency of diaphragm 38 is tuned to the frequency of a desirable induction sound.

Figure 4:
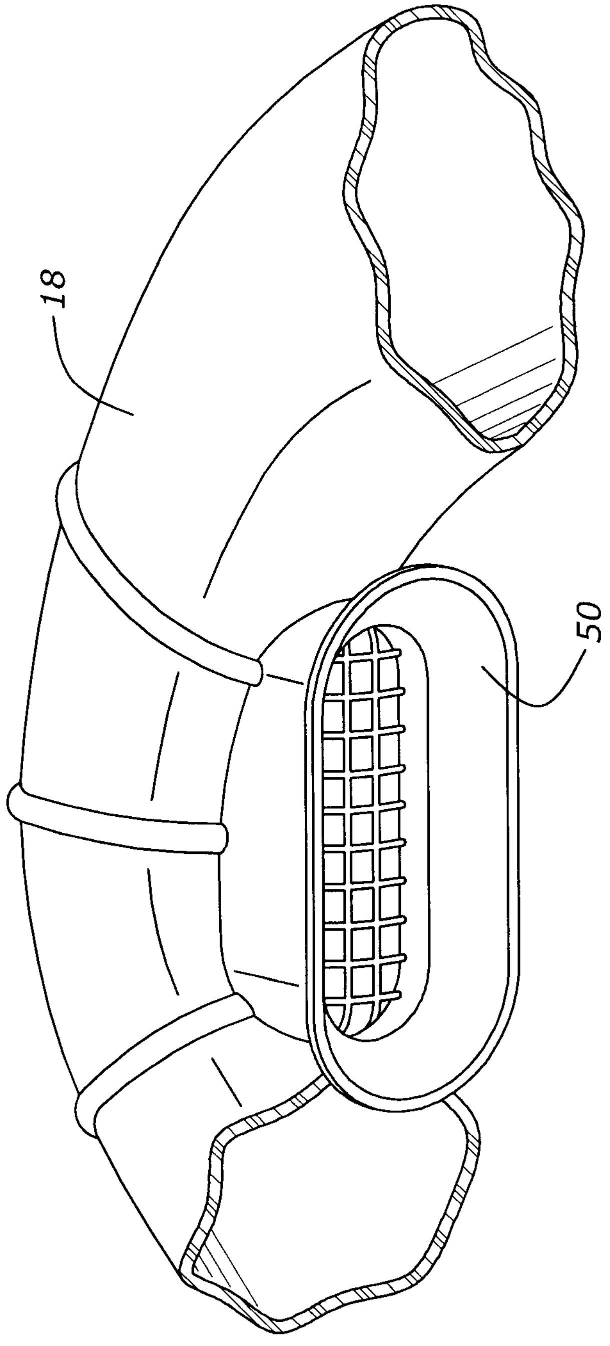
FIG. 4 is a perspective view of an acoustic amplifier according to an aspect of the present invention and having an attached directional horn.

Once a desirable frequency of sound has been generated by diaphragm 38, the question becomes how to transmit this desirable sound to the operator of the vehicle. This may be done in two ways. FIG. 4 shows a directional horn, 50, which is attached to, and acoustically coupled with, diaphragm 38. However, in the case of vehicles having superior sound deadening within the dash panel extending between the engine and passenger compartment, it is not possible to provide, in some cases, an adequate level of the desired sound characteristic of the engine. In such a case, a sound collector, 54, and an insulated duct, 58, as shown in FIG. 1, will be used to conduct the desired sound into a passenger compartment, 62, of a vehicle. Collector 54, duct 58, and diaphragm 38 define an additional tuning volume which may be used in concert with the tuning volume extending between diaphragm 38 and air supply duct 18. Beneficially, the volumes of sound collector 54 and acoustic transfer duct 58 may be tuned to cooperate with the tuned acoustic amplifier characterized by diaphragm 38.

Duct 58 is insulated to prevent the ingress of undesirable engine and road noise into passenger compartment 62, while allowing the passage of a desirable engine sound characteristic. In effect, sound insulation applied to insulated duct 58 prevents contamination of sound being transmitted through duct 58 with undesired sounds such as road noise and other engine noises. It should be appreciated that there is no bulk flow of air through duct 58; only selected induction sound is transmitted through duct 58.

According to another aspect of the present invention, a method of enhancing the sound quality of an engine includes first determining a dominant frequency of a desirable sound being generated within an engine combustion air supply duct 18, followed by locating an anti-node for the desirable sound within air supply duct 18. Then, by providing a diaphragm-driven acoustic device, illustrated as including diaphragm 38, and either a directional horn, 50, or a sound collector induct 54, 58, as illustrated in FIG. 1, furnishing the sound to the passenger compartment of a vehicle to be available to the occupants of the vehicle during normal operation of the vehicle.

The foregoing invention has been described in accordance with the relevant legal standards, thus the description is exemplary rather than limiting in nature. Variations and modifications to the disclosed embodiment may become apparent to those skilled in the art and fall within the scope of the invention. Accordingly the scope of legal protection afforded this invention can only be determined by studying the following claims.

What is claimed is:

1. A combustion air induction system for an internal combustion engine, comprising:
- an air cleaner;
- a throttle body;
- an air duct extending from said air cleaner to said throttle body; and
- an acoustic amplifier mounted to said air duct at the location of a sound pressure anti-node wherein said acoustic amplifier comprises a diaphragm mounted to said duct, with the diaphragm being tuned to the frequency of a desirable induction sound, whereby pressure pulses attributable to sound pressure at the tuned frequency will excite the diaphragm and amplify the desired sound.

2. An air induction system according to claim 1, wherein said acoustic amplifier further comprises a directional horn having a base which is acoustically coupled to said diaphragm.

3. An air induction system according to claim 1, wherein said diaphragm is mounted to said duct adjacent a port formed in said duct.

4. An air induction system according to claim 1, wherein said diaphragm has a natural frequency of vibration which is tuned to the frequency of a desirable induction sound.

5. An air induction system according to claim 1, wherein said acoustic amplifier is mounted along the length of said duct at the location of a sound pressure anti-node characterized by a selected frequency.

6. An air induction system according to claim 1, wherein said diaphragm is impermeable and sealed to prevent induction air from entering or leaving said air duct through the acoustic amplifier.

7. A method of enhancing the sound quality of an internal combustion engine, comprising:
- determining at least one frequency of desirable sound being generated within a combustion air induction system of the engine;
- locating at least one anti-node for the desirable sound within the air induction system; and
- providing a diaphragm-driven acoustic device at the location of said at least one anti-node, with said diaphragm having a natural frequency which is matched to the frequency of the desirable sound, whereby pressure pulses attributable to sound pressure existing within the air induction system at the tuned frequency will excite the diaphragm and amplify the desired sound.

8. A method according to claim 7, wherein said diaphragm-driven acoustic device is located upon a clean air duct extending from an air cleaner to a throttle body.

9. A method according to claim 7, further comprising directing the output of said diaphragm-driven acoustic device toward the passenger compartment of a vehicle.

10. A method according to claim 7, wherein said diaphragm is impermeable, whereby induction air will not be permitted to flow through said diaphragm.

11. A method according to claim 7, further comprising ducting the output of said diaphragm-driven acoustic device into a passenger compartment of a vehicle.

12. A tuned, sound enhancing air induction system for an internal combustion engine installed in a motor vehicle, comprising:
- an air cleaner;
- a throttle body;
- an engine combustion air supply duct extending from the air cleaner to the throttle body;
- a tuned acoustic amplifier mourned to said air duct, with said acoustic amplifier amplifying engine induction sound which is otherwise confined by said air duct, wherein said induction sound has a pre-selected frequency exhibiting an anti-node at the location of the acoustic amplifier; and
- a sound collector and acoustic transfer duct for supplying engine induction sound at said pre-selected frequency to a portion of a vehicle.

13. An air induction system according to claim 12, wherein said sound collector and acoustic transfer duct comprise a tube which is routed into a passenger compartment of a vehicle, whereby engine induction sound having said pre-selected frequency will be audible to an occupant of the vehicle.

14. An air induction system according to claim 12, wherein said acoustic amplifier comprises a frequency-tuned diaphragm mounted to said duct at a sound pressure anti-node which is characteristic of said pre-selected frequency.

15. An air induction system according to claim 12, wherein said diaphragm is impermeable and sealed to prevent any bulk flow of induction air either into, or out of, the supply air duct.

16. An air induction system according to claim 12, wherein said sound collector and acoustic transfer duct comprise a flexible tube which is sound-insulated to prevent contamination of sound being routed through the tube with undesired sound.

17. An air induction system according to claim 12, wherein the volumes of said sound collector and said acoustic transfer duct are tuned to cooperate with said tuned acoustic amplifier.

* * * * *